(12) United States Patent
Sawada et al.

(10) Patent No.: US 7,155,927 B2
(45) Date of Patent: Jan. 2, 2007

(54) EXHAUST HEAT UTILIZING REFRIGERATION SYSTEM

(75) Inventors: Norio Sawada, Gunma (JP); Kazuo Matsumoto, Osaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 249 days.

(21) Appl. No.: 10/488,533

(22) PCT Filed: Sep. 3, 2002

(86) PCT No.: PCT/JP02/08907

§ 371 (c)(1),
(2), (4) Date: Sep. 19, 2004

(87) PCT Pub. No.: WO03/021166

PCT Pub. Date: Mar. 13, 2003

(65) Prior Publication Data

US 2005/0011209 A1   Jan. 20, 2005

(30) Foreign Application Priority Data

Sep. 4, 2001   (JP)  ............... 2001-267040

(51) Int. Cl.
*F25B 27/00*   (2006.01)
(52) U.S. Cl. .................................... 62/486
(58) Field of Classification Search ........... 62/238.1, 62/238.3, 475, 476, 478, 479, 482, 483, 485, 62/486
See application file for complete search history.

(56) References Cited

U.S. PATENT DOCUMENTS

| | | | |
|---|---|---|---|
| 4,285,211 A * | 8/1981 | Clark | ............ 62/335 |
| 4,410,134 A | 10/1983 | Heimbach et al. | |
| 5,467,812 A * | 11/1995 | Dean et al. | ........... 165/62 |
| 5,490,398 A * | 2/1996 | Cline | ............ 62/497 |
| 5,533,362 A * | 7/1996 | Cook et al. | ........... 62/476 |
| 5,678,626 A * | 10/1997 | Gilles | ........... 165/62 |
| 5,819,553 A * | 10/1998 | Ishiguro | ........... 62/495 |
| 5,943,874 A * | 8/1999 | Maeda | ........... 62/271 |
| 6,050,102 A * | 4/2000 | Jin | ........... 62/324.6 |
| 6,295,825 B1 * | 10/2001 | Jin | ........... 62/238.7 |
| 6,314,744 B1 * | 11/2001 | Ogawa | ........... 62/79 |
| 6,367,279 B1 * | 4/2002 | Jin | ........... 62/324.1 |

FOREIGN PATENT DOCUMENTS

| | | |
|---|---|---|
| JP | 63-89554 | 6/1988 |
| JP | 08-232681 | 9/1996 |
| JP | 08-247571 | 9/1996 |
| JP | 09-21575 | 1/1997 |
| JP | 10-205910 A * | 8/1998 |
| JP | 11-101518 | 4/1999 |

* cited by examiner

*Primary Examiner*—Mohammad M. Ali
(74) *Attorney, Agent, or Firm*—McDermott Will & Emery LLP

(57) ABSTRACT

There is provided an exhaust-heat using refrigerating system which can add the function of refrigerant heater, condenser or super-cooler by using exhaust heat. The system comprises a heat pump apparatus 1 equipped with a compressor 12, a first heat exchanger 14, a pressure-reducing device 15 and a second heat exchanger 21, and an absorption type refrigerating machine 5 equipped with a regenerator 51 using exhaust heat as a heat source, a condenser 53, an evaporator 54 and an absorber 55. A third heat exchanger 17 is connected to the first heat exchanger 14 in parallel, and the heat source of the third heat exchanger 17 is achieved from the evaporator 54 of the absorption type refrigerating machine.

15 Claims, 5 Drawing Sheets

EXHAUST HEAT UTILIZING REFRIGERATION SYSTEM

TECHNICAL FIELD

The present invention relates to an exhaust heat using refrigerating system suitably used for a show case, an air conditioner or the like.

BACKGROUND ART

There is generally known an air conditioner comprising a heat pump apparatus having a compressor, a condenser, a pressure-reducing device and an evaporator.

In this type of air conditioner, the evaporator and the condenser are frequently designed to be of air-cooling type. When they are of air-cooling type, sufficient evaporating temperature cannot be achieved in an evaporator disposed outdoors under heating operation at a low outside temperature, so that there is a problem that COP (Coefficient of Performance) is remarkably reduced. In order to solve this problem, there has been hitherto proposed an air condition in which a refrigerant heater such as a burner or the like is disposed and COP is increased by heating refrigerant. Furthermore, there has been also proposed another air conditioner in which a super-cooler is equipped to increase COP under cooling operation.

However, both the cases need heat source equipment, which increases not only the initial cost, but also the running cost because a burner or the like needs combustion heat of fossil fuel.

Therefore, an object of the present invention is to provide an exhaust-heat using refrigerating system which can add the function of a refrigerant heater or super-cooler not by using any burner or the like, but by using exhaust heat.

DISCLOSURE OF THE INVENTION

The present invention is characterized by comprising a heat pump apparatus equipped a compressor, a first heat exchanger, a pressure-reducing device and a second heat exchanger, and an absorption type refrigerating machine equipped with a regenerator using exhaust heat as a heat source, a condenser, an evaporator and an absorber, wherein a third heat exchanger is connected to the first heat exchanger in parallel, and a heat source of the third heat exchanger is achieved from the evaporator of the absorption type refrigerating machine.

The present invention is characterized by comprising a heat pump apparatus equipped with a compressor, a first heat exchanger, a pressure-reducing device and a second heat exchanger, and an absorption type refrigerating machine equipped with a regenerator using exhaust heat as a heat source, a condenser, an evaporator and an absorber, wherein a third heat exchanger is connected to the first heat exchanger in series, and a heat source of the third heat exchanger is achieved from the evaporator of the absorption type refrigerating machine.

The present invention is characterized by comprising an electric generator, a micro gas turbine for driving the electric generator, a heat pump apparatus equipped with a compressor driven by electric power of the electric generator, a first heat exchanger, a pressure-reducing device and a second heat exchanger, and an absorption type refrigerating machine equipped with a regenerator using exhaust heat of the micro gas turbine as a heat source, a condenser, an evaporator and an absorber, wherein a third heat exchanger is connected to the first heat exchanger in parallel and a heat source of the third heat exchanger is achieved from the evaporator of the absorption type refrigerating machine.

The present invention is characterized by comprising an electric generator, a micro gas turbine for driving the electric generator, a heat pump apparatus equipped with a compressor driven by electric power of the electric generator, a first heat exchanger, a pressure-reducing device and a second heat exchanger, and an absorption type refrigerating machine equipped with a regenerator using exhaust heat of the micro gas turbine as a heat source, a condenser, an evaporator and an absorber, wherein a third heat exchanger is connected to the first heat exchanger in series and a heat source of the third heat exchanger is achieved from the evaporator of the absorption type refrigerating machine.

The present invention is characterized in that the regenerator of the absorption type refrigerating machine is disposed in a flue through which exhaust heat passes.

The present invention is characterized in that a liquid pipe is connected between the third heat exchanger and the evaporator of the absorption type refrigerating machine and water or antifreeze liquid is circulated to achieve the heat source of the third heat exchanger from the evaporator of the absorption type refrigerating machine.

The present invention is characterized is characterized in that a liquid pipe is connected between the third heat exchanger and the evaporator of the absorption type refrigerating machine, a water heater using exhaust heat is equipped, a liquid pipe is connected between the water heater and the third heat exchanger and water or antifreeze liquid is circulated to achieve the heat source of the third heat exchanger from the evaporator of the absorption type refrigerating machine or the water heater.

The present invention is characterized in that both the regenerator of the absorption type refrigerating machine and the water heater using the exhaust heat are disposed in a flue through which exhaust heat passes.

The present invention is characterized by comprising a heat pump apparatus equipped a compressor, a first heat exchanger, a pressure-reducing device and a second heat exchanger, and an absorption type refrigerating machine equipped with a regenerator using exhaust heat as a heat source, a condenser, an evaporator and an absorber, wherein the evaporator of the absorption type refrigerating machine is connected to the first heat exchanger in parallel.

The present invention is characterized by comprising a heat pump apparatus equipped a compressor, a first heat exchanger, a pressure-reducing device and a second heat exchanger, and an absorption type refrigerating machine equipped with a regenerator using exhaust heat as a heat source, a condenser, an evaporator and an absorber, wherein the evaporator of the absorption type refrigerating machine is connected to the first heat exchanger in series.

The present invention is characterized by comprising an electric generator, a micro gas turbine for driving the electric generator, a heat pump apparatus equipped with a compressor driven by electric power of the electric generator, a first heat exchanger, a pressure-reducing device and a second heat exchanger, and an absorption type refrigerating machine equipped with a regenerator using exhaust heat of the micro gas turbine as a heat source, a condenser, an evaporator and an absorber, wherein the evaporator of the absorption type refrigerating machine is connected to the first heat exchanger in parallel.

The present invention is characterized by comprising an electric generator, a micro gas turbine for driving the electric generator, a heat pump apparatus equipped with a compressor driven by electric power of the electric generator, a first heat exchanger, a pressure-reducing device and a second heat exchanger, and an absorption type refrigerating machine equipped with a regenerator using exhaust heat of the micro gas turbine as a heat source, a condenser, an evaporator and an absorber, wherein the evaporator of the absorption type refrigerating machine is connected to the first heat exchanger in series.

The present invention is characterized in that the regenerator of the absorption type refrigerating machine is disposed in a flue through which exhaust heat passes.

The present invention is characterized in that the first heat exchanger is of an air-cooling type.

The present invention is characterized in that the absorber of the absorption type refrigerating machine is equipped with a refrigerant mixer, an absorption heat radiator and solution circulating means.

BEST MODE FOR CARRYING OUT THE INVENTION

Embodiments of the present invention will be described with reference to the accompanying drawings.

Figure 1:
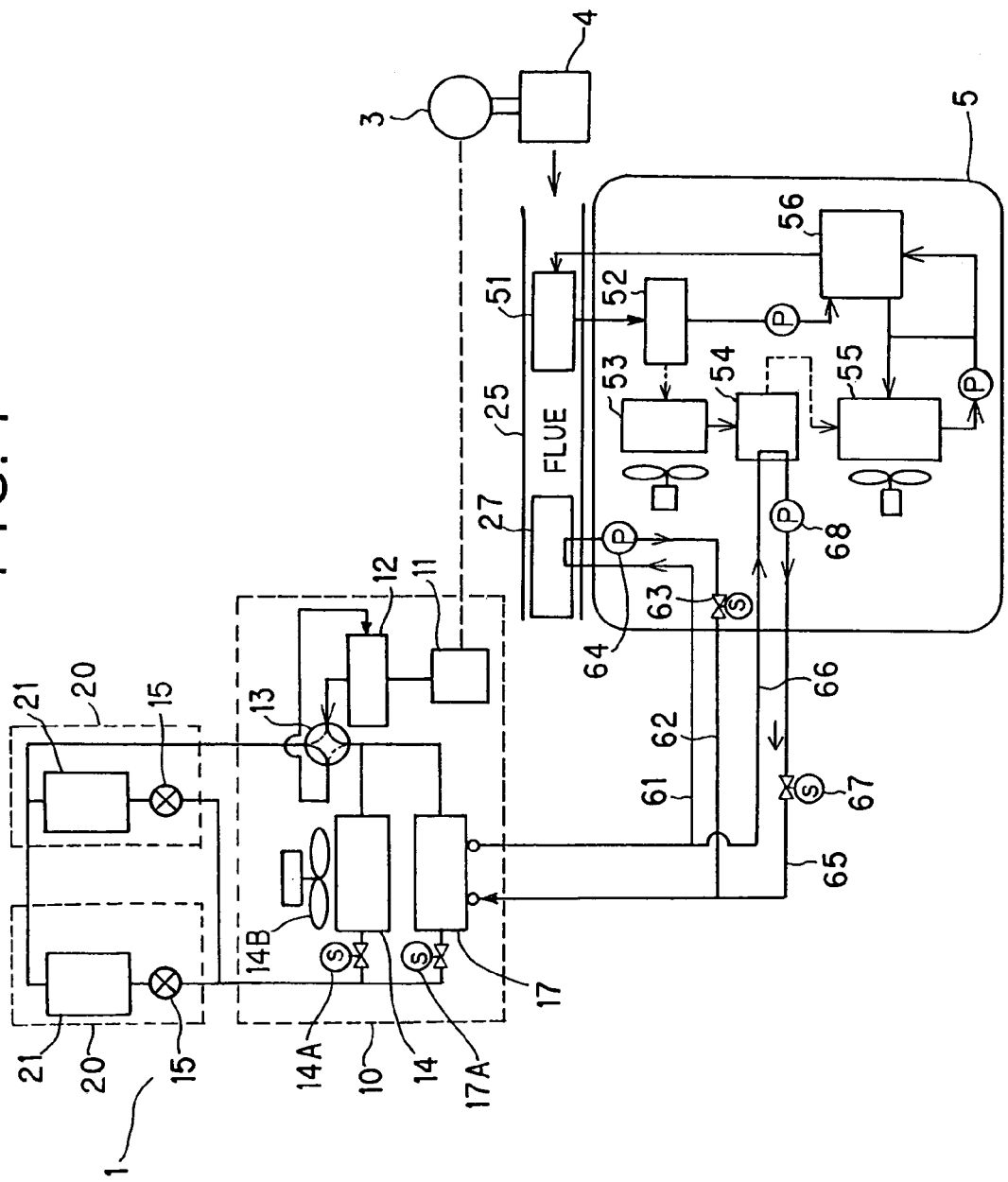
FIG. 1 is a circuit diagram showing an embodiment of an exhaust heat using refrigerating system according to the present invention.

FIG. 1 is a circuit diagram showing an exhaust-heat using refrigerating system. In FIG. 1, 1 represents an air conditioner (heat pump apparatus), 3 represents an electric generator, 4 represents a micro gas turbine for driving the electric generator 3 and 5 represents an absorption type refrigerating machine.

The air conditioner 1 comprises an outdoor unit 10 and indoor units 20. In the outdoor unit 10 are mounted a motor 11 connected to the electric generator 3, a compressor 12 driven by the motor 11, a four-way valve 13 and an air-cooling type heat exchanger (first heat exchanger) 14 having a fan 14B. In the indoor unit 20 are mounted a pressure-reducing device 15 and an air cooling type heat exchanger (second heat exchanger) 21.

In FIG. 1, the motor 11 and the compressor 12 are illustrated as being independent of each other, however, they may be mounted in the same container.

Furthermore, a liquid-cooling type heat exchanger (third heat exchanger) 17 based on water or anti-freeze liquid is connected to the first heat exchanger 14 in parallel, and each of the heat exchangers 14, 17 is selectively used by opening/closing each of electromagnetic valves 14A, 17A.

The absorption type refrigerating machine 5 comprises a regenerator 51, a separator 52, a condenser 53, an evaporator 54, an absorber 55 and a solution heat exchanger 56. The regenerator 51 is disposed in a flue through which exhaust gas from the micro gas turbine 4 is led, and it operates with the exhaust heat of the micro gas turbine 4 as a heat source. A hot water heat exchanger (water heater) 27 is disposed in the flue 25, and water or antifreeze liquid is heated by using the exhaust heat of the micro gas turbine 4 in the hot water heat exchanger 27.

The hot water heat exchanger 27 and the third heat exchanger 17 of the outdoor unit 10 are connected to each other through liquid pipes 61, 62, and an electromagnetic valve 63 and a pump 64 are disposed in one liquid pipe 61. Furthermore, the third heat exchanger 17 and the evaporator 54 of the absorption type refrigerating machine 5 are connected to each other through liquid pipes 65, 66, and an electromagnetic valve 67 and a pump 68 is disposed in one liquid pipe 65.

Next, the operation of this embodiment will be described.

Under heating operation, the four-way valve 13 of the outdoor unit 10 is switched to the position indicated by a broken line, and one of the heat exchangers 14 and 17 arranged in parallel is selected by opening/closing the respective electromagnetic valves 14A, 17A. When the first heat exchanger 14 is selected, the motor 11 is supplied with power from the electric generator 3 and driven, so that the compressor 12 is driven. At this time, refrigerant (for example, chlorofluorocarbon) from the compressor 12 thus driven is circulated through the indoor heat exchanger 21, the pressure-reducing device 15 and the first heat exchanger 14, and then returned to the compressor 12.

The refrigerant absorbs heat from air in the first heat exchanger 14 to be vaporized, and then condensed in the indoor heat exchanger 21 to radiate heat, whereby the room is heated.

On the other hand, when the third heat exchanger 17 is selected, the electromagnetic valve 63 is opened and the pump 64 is driven in order to lead the water or antifreeze liquid heated in the hot water heat exchanger 27 to the third heat exchanger 17. At this time, the electromagnetic valve 67 is closed, and the pump 68 is stopped. When the third heat exchanger 17 is selected, the refrigerant from the compressor 12 is circulated through the indoor heat exchanger 21, the pressure-reducing device 15 and the third heat exchanger 17, and then returned to the compressor 12.

The refrigerant is vaporized in the third heat exchanger 17 to absorb heat, and condensed in the indoor heat exchanger 21 to radiate heat, whereby the room is heated.

Since the water or antifreeze liquid heated in the hot water heat exchanger 27 is circulated in the third heat exchanger 17, more sufficient evaporating temperature is achieved as compared with the air-cooling type first heat exchanger 14, so that COP can be enhanced.

Under cooling operation, the four-way valve 13 of the outdoor unit 10 is switched to the position indicated by a solid line, and any one of the heat exchangers 14, 17 arranged in parallel is selected by opening/closing the respective electromagnetic valves 14A, 17A. When the first heat exchanger 14 is selected, the motor 11 is supplied with power from the electric generator 3 to be driven, and thus the compressor 12 is driven. At this time, the refrigerant (for example, chlorofluorocarbon) from the compressor 12 is circulated through the first heat exchanger 14, the pressure-reducing device 15 and the indoor heat exchanger 21, and then returned to the compressor 12.

The refrigerant is condensed in the first heat exchanger 14 to radiate heat, and vaporized in the indoor heat exchanger 21 to absorb heat, whereby the room is cooled.

When the third heat exchanger 17 is selected, the electromagnetic valve 67 is opened and the pup 68 is driven in order to lead cold water cooled in the evaporator 54 of the absorption type refrigerating machine 5 to the third heat exchanger 17. At this time, the electromagnetic valve 63 is closed, and the pump 64 is stopped. When the third heat exchanger 17 is selected, the refrigerant from the compressor 12 is circulated through the third heat exchanger 17, the pressure-reducing device 15 and the indoor heat exchanger 21, and then returned to the compressor 12.

The refrigerant is condensed in the third heat exchanger to radiate heat, and vaporized in the indoor heat exchanger 21 to absorb heat, whereby the room is cooled.

Since the water or antifreeze liquid cooled in the evaporator 54 of the absorption type refrigerating machine 5 is circulated in the third heat exchanger 17, the condensation pressure of the refrigerant is more greatly reduced as compared with the air-cooling type first heat exchanger 14, so that COP can be enhanced.

Next, the operation of the absorption type refrigerating machine 5 will be described.

The absorption type refrigerating machine 5 is designed as a single-regenerator type, and it operates with the exhaust heat of the micro gas turbine as a heat source.

Figure 2:
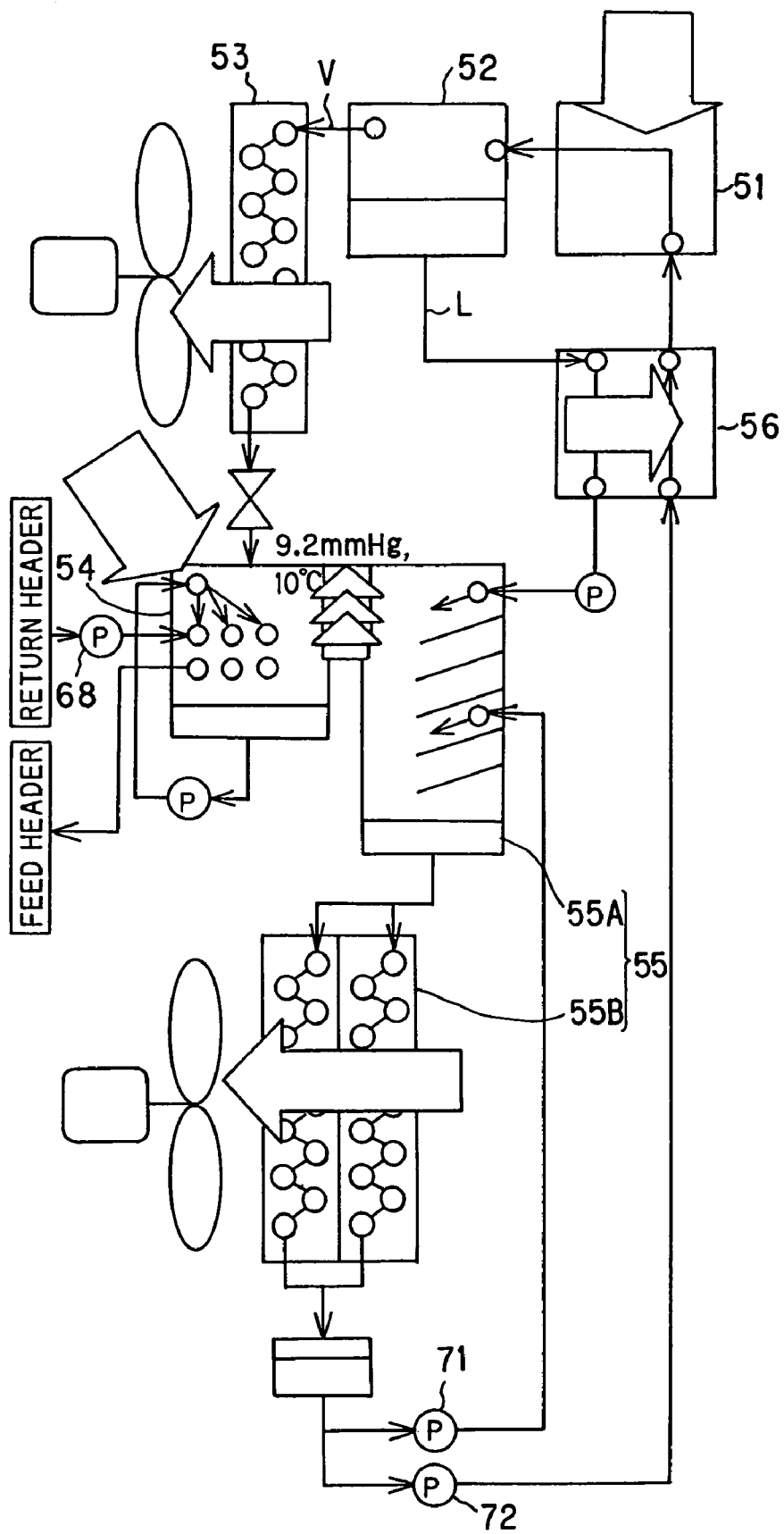
FIG. 2 is a circuit diagram showing an absorption type refrigerating machine.

As shown in FIG. 2, absorption liquid (for example, lithium bromide aqueous solution) heated in the regenerator 51 is separated into concentrated liquid L and water vapor V in the separator 52. The water vapor V is cooled and condensed into liquid (for example, water of 50° C.) in the condenser 53. The condensed water is vaporized, for example, at about 10° C. under vacuum of about 10 mmHg in the evaporator 54, and the water vapor thus vaporized is fed into a refrigerant mixing absorber (refrigerant mixer) 55A constituting the absorber 55. On the other hand, the concentrated liquid L from the separator 52 is cooled in the solution heat exchanger 56, and dropped into the refrigerant mixing absorber 55A to absorb the water vapor passed through the evaporator 54.

The absorption liquid absorbing the water vapor is cooled in an air-cooling type absorption heat radiator 55B constituting the absorber 55. A part of the absorption liquid thus cooled is circulated in a pump 71, dropped into the refrigerant mixing absorber 55A to absorb the water vapor passing through the evaporator 54 again, and then fed into the air-cooling type absorption heat radiator (absorption heat radiator) 55B. The absorption liquid cooled in the absorption heat radiator 55B is finally circulated in a pump 72, cooled in the solution heat exchanger 56 and then returned to the regenerator 51.

In this embodiment, since the liquid pipe is connected to the evaporator 54, the water or antifreeze liquid circulated through the pump 68 is cooled at 15° C. to 25° C., and the liquid thus cooled is circulated in the third heat exchanger 17 of the outdoor unit 10.

Figure 3:
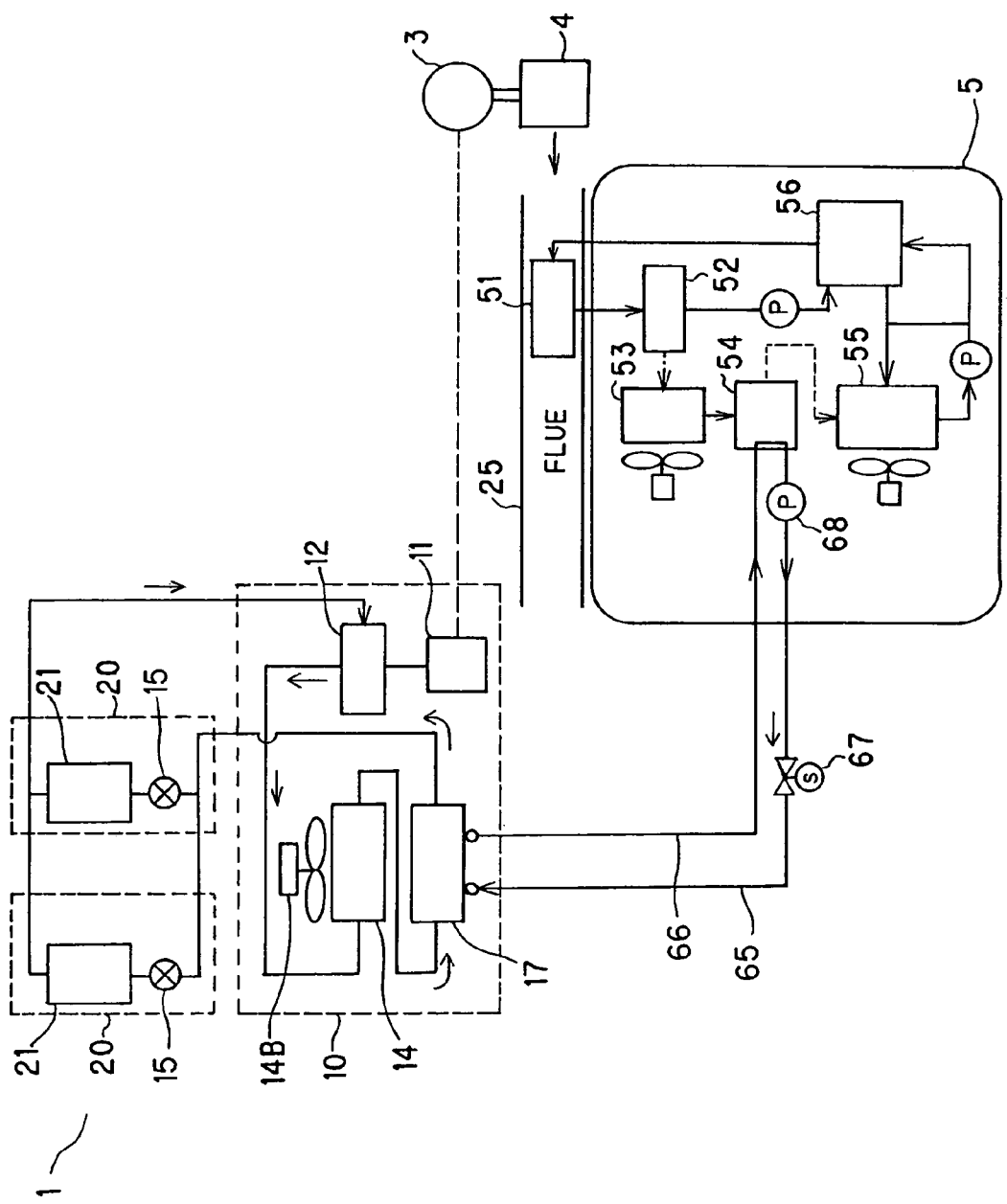
FIG. 3 is a circuit diagram showing another embodiment.

FIG. 3 shows another embodiment.

In the embodiment described above, the air conditioner 1 is targeted. In this embodiment, a showcase 100 is targeted. The show case 100 comprises a refrigerating machine unit 10, and a main body 20.

In the refrigerating machine unit 10 are mounted a motor 11 connected to an electric generator 3, a compressor 12 driven by the motor 11, and an air-cooling type heat exchanger (first heat exchanger) 14 having a fan 14B. In the main body 20 are mounted a pressure-reducing device 15 and an air-cooling type heat exchanger (second heat exchanger) 21.

A liquid-cooling type heat exchanger (third heat exchanger) 17 based on water or antifreeze water is connected to the downstream side of the first heat exchanger 14 in series.

The absorption type refrigerating machine 5 comprises a regenerator 51, a separator 52, a condenser 53, an evaporator 54, an absorber 55 and a solution heat exchanger 56. The regenerator 51 is disposed in a flue 25 through which exhaust gas from the micro gas turbine 4 is led, and operates with the exhaust heat of the micro gas turbine 4 as a heat source. The operation of the absorption type refrigerating machine 5 is the same as described above.

The third heat exchanger 17 of the refrigerating machine unit 10 and the evaporator 54 of the absorption type refrigerating machine 5 are connected to each other through liquid pipes 65, 66, and an electromagnetic valve 67 and a pump 68 are disposed in one liquid pipe 65.

In this embodiment, by opening the electromagnetic valve 67 and driving the pump 68 under cooling operation, water or antifreeze liquid cooled in the evaporator 54 of the absorption type refrigerating machine 5 is circulated at all times in the third heat exchanger 17. Accordingly, the refrigerant is cooled by the air-cooling type first heat exchanger 14 and the third heat exchanger 17, and thus sufficient super-cooling degree of the refrigerant can be achieved, so that COP can be markedly enhanced.

Figure 4:
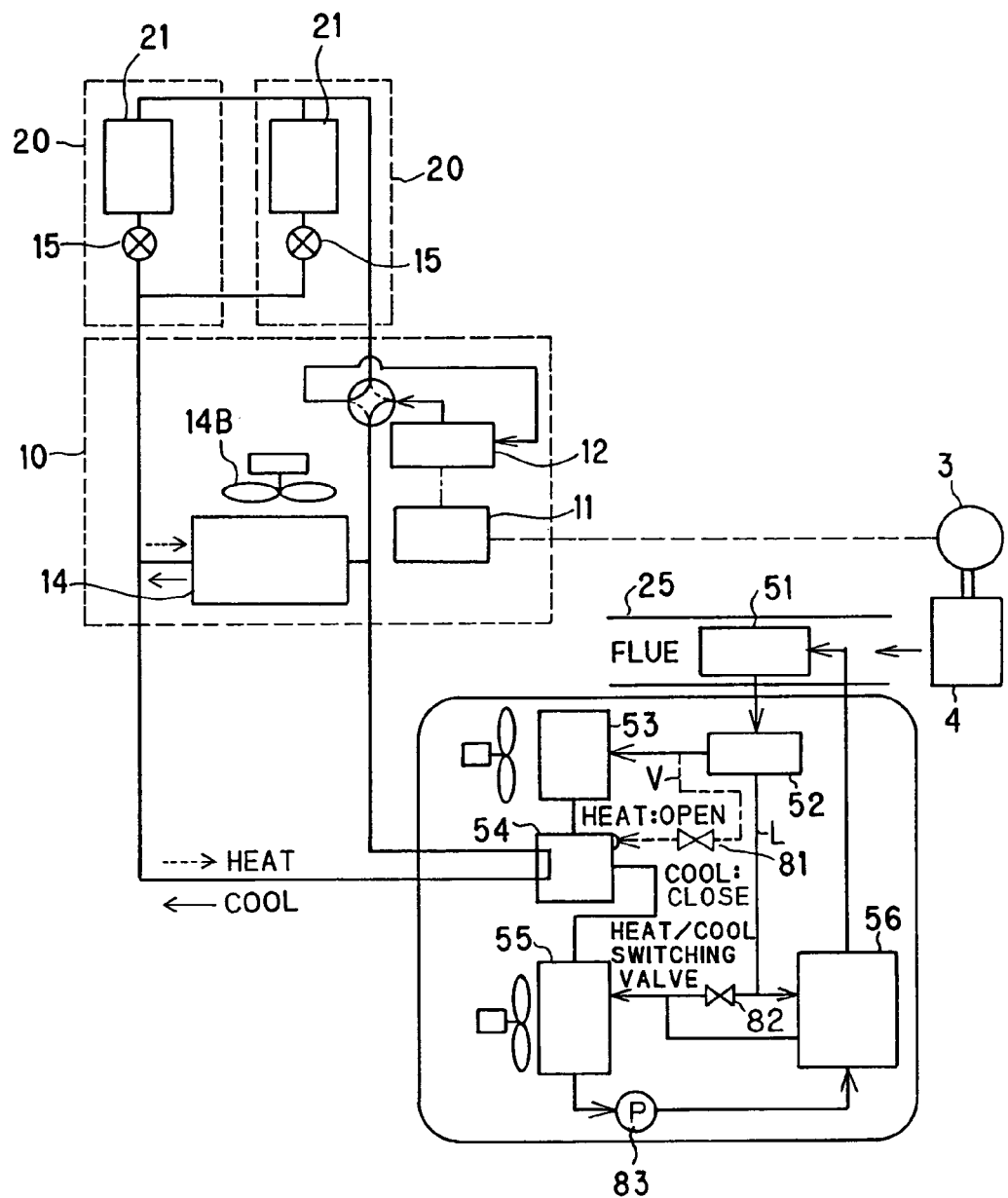
FIG. 4 is a circuit diagram showing another embodiment.

FIG. 4 shows another embodiment.

In this embodiment, the evaporator 54 of the absorption type refrigerating machine 5 is connected to the first heat exchanger 14 of the out door unit 10 in parallel. The absorption type refrigerating machine 5 has both of a cooling function of making the evaporator 54 function as a so-called cooler to cool the refrigerant led to the evaporator 54 and a heating function of making the evaporator 54 function as a so-called heater to heat the refrigerant led to the evaporator 54 under the control thereof.

That is, the absorption type refrigerating machine 5 comprises an electromagnetic valve 81 for directly leading the water vapor V separated in the separator 52 to the evaporator 54 with bypassing the condenser 53, and an electromagnetic valve 82 for leading the concentrated liquid L separated in the separator 52 to the absorber 55. The other construction is the same as described above.

Next, the operation of this embodiment will be described.

Under heating operation, electromagnetic valves 81, 82 of the absorption type refrigerating machine 5 are opened. The refrigerant at the air conditioner 1 side is split into the first heat exchanger 14 and the evaporator 54 of the absorption type refrigerating machine 5.

When the electrical generator 3 is driven, the regenerator 51 operates with the exhaust heat of the micro gas turbine 4 as a heat source, and the absorption liquid is separated into the concentrated liquid L and the water vapor V in the separator 52. The water vapor V is passed through the electromagnetic valve 81 and directly led to the evaporator 54 to be condensed, thereby heating the refrigerant at the air conditioner 1 side, and then it is fed as condensed liquid into the absorber 55. On the other hand, the concentrated liquid L from the separator 52 is passed through the electromagnetic valve 82 and then dropped into the absorber 55, in which the concentrated liquid L is mixed with the condensed water passed through the evaporator 54. The absorption liquid thus mixed is circulated by the pump 83, and returned to the regenerator 51 through the solution heat exchanger 56.

In this embodiment, under heating operation, the flow of the refrigerant at the air conditioner 1 side is split into the first heat exchanger 14 and the evaporator 54. Since the water vapor is condensed in the evaporator 54 and thus the refrigerant is heated, sufficient evaporating temperature is achieved in the evaporator 54, so that COP can be enhanced.

During cooling operation, the electromagnetic valves 81, 82 of the absorption type refrigerating machine 5 are closed. The flow of the refrigerant at the air conditioner 1 side is split into the first heat exchanger 14 and the evaporator 54 of the absorption type refrigerating machine 5 as indicated by a solid line of FIG. 4. When the electromagnetic valves 81, 82 of the absorption type refrigerating machine 5 are closed, the evaporator 54 functions as an original evaporator as shown in FIG. 2, and the refrigerant led to the evaporator 54 concerned is cooled. Since sufficiently lower temperature is achieved in the evaporator 54 of the absorption type refrigerating machine 5 as compared with the air-cooling type first heat exchanger 14, the condensation pressure of the refrigerant at the compressor side is reduced, so that COP can be enhanced.

Figure 5:
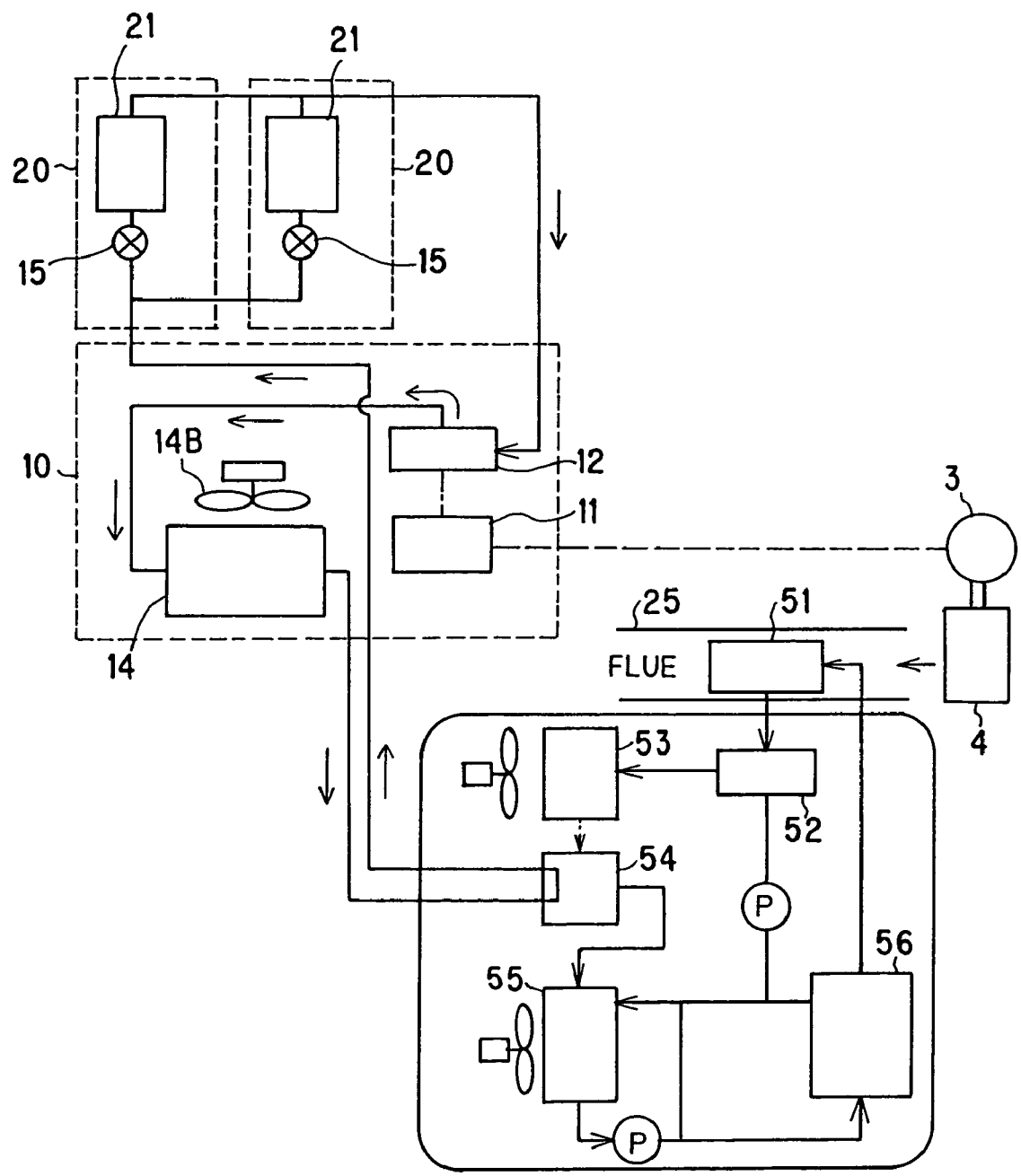
FIG. 5 is a circuit diagram showing another embodiment.

FIG. 5 shows another embodiment.

In the embodiment shown in FIG. 4, the air conditioner 1 is targeted. However, in this embodiment, a show case 100 is targeted. The show case 100 comprises a refrigerating machine unit 10 and a main body 20.

In the refrigerating machine unit 10 are mounted a motor 11 connected to an electrical generator 3, a compressor driven by the motor 11 and an air-cooling type heat exchanger (first heat exchanger) 14 having a fan 14B. In the main body 20 are mounted an air-cooling type heat exchanger (second heat exchanger) 21 and a pressure-reducing device 15.

In this embodiment, a evaporator 54 of an absorption type refrigerating machine 5 is connected to the downstream side of the first heat exchanger 14.

The absorption type refrigerating machine comprises a regenerator 51, a separator 52, a condenser 53, an evaporator 54, an absorber 55 and a solution heat exchanger 56. The regenerator 51 is disposed in a flue 25 for leading exhaust gas from a micro gas turbine 4, and operates with the exhaust heat of the micro gas turbine as a heat source. The operation of the absorption type refrigerating machine 5 is the same as described above.

In this embodiment, the refrigerant at the air conditioner 1 side is cooled in the first heat exchanger 14 and further cooled in the evaporator 54, and thus sufficient super-cooling degree is achieved. As a result, COP can be remarkably enhanced.

The present invention has been described on the basis of the embodiments, however, the present invention is not limited to these embodiments.

INDUSTRIAL APPLICABILITY

The present invention is suitably applicable to a show case or a heat pump apparatus such as an air conditioner or the like because the function of a refrigerator heater, a condenser or a super-cooler can be added by using exhaust heat.

The invention claimed is:

1. An exhaust-heat using refrigerating system, characterized by comprising:
   a heat pump apparatus equipped a compressor, a first heat exchanger, a pressure-reducing device and a second heat exchanger; and
   an absorption type refrigerating machine equipped with a regenerator using exhaust heat as a heat source, a condenser, an evaporator and an absorber, wherein a third heat exchanger is connected to the first heat exchanger in parallel, and a heat source of the third heat exchanger is achieved from the evaporator of the absorption type refrigerating machine.

2. An exhaust-heat using refrigerating system, characterized by comprising:
   a heat pump apparatus equipped with a compressor, a first heat exchanger, a pressure-reducing device and a second heat exchanger; and
   an absorption type refrigerating machine equipped with a regenerator using exhaust heat as heat source, a condenser, an evaporator and an absorber, wherein a third heat exchanger is connected to the first heat exchanger in series, and a heat source of the third heat exchanger is achieved from the evaporator of the absorption type refrigerating machine.

3. An exhaust-heat using refrigerating system, characterized by comprising:
   an electric generator;
   a micro gas turbine for driving the electric generator;
   a heat pump apparatus equipped with a compressor driven by electric power of the electric generator, a first heat exchanger, a pressure-reducing device and a second heat exchanger; and
   an absorption type refrigerating machine equipped with a regenerator using exhaust heat of the micro gas turbine as a heat source, a condenser, an evaporator and an absorber, wherein a third heat exchanger is connected to the first heat exchanger in parallel and a heat source of the third heat exchanger is achieved from the evaporator of the absorption type refrigerating machine.

4. An exhaust-heat using refrigerating system, characterized by comprising:
   an electric generator;
   a micro gas turbine for driving the electric generator;
   a heat pump apparatus equipped with a compressor driven by elecric power of the electric generator, a first heat exchanger, a pressure-reducing device and a second heat exchanger; and
   an absorption type refrigerating machine equipped with a regenerator using exhaust heat of the micro gas turbine as a heat source, a condenser, an evaporator and an absorber, wherein a third heat exchanger is connected to the first heat exchanger in series and a heat source of the third heat exchanger is achieved from the evaporator of the absorption type refrigerating machine.

5. An exhaust-heat using refrigerating system according to any one of claims 1 to 4, wherein the regenerator of the absorption type refrigerating machine is disposed in a flue through which exhaust heat passes.

6. The exhaust-heat using refrigerating system according to any one claim 1 or 4, wherein a liquid pipe is connected between the third heat exchanger and the evaporator of the absorption type refrigerating machine and water or antifreeze liquid is circulated to achieve the heat source of the third heat exchanger from the evaporator of the absorption type refrigerating machine.

7. The exhaust-heat using refrigerating system according to claim 1 or 3, wherein a liquid pipe is connected between the third heat exchanger and the evaporator of the absorption type refrigerating machine, a water heater using exhaust heat is equipped, a liquid pipe is connected between the water heater and the third heat exchanger and water or antifreeze liquid is circulated to achieve the heat source of the third heat exchanger from the evaporator of the absorption type refrigerating machine or the water heater.

8. The exhaust-heat using refrigerating system according to claim 7, wherein both the regenerator of the absorption type rerfrigerating machine and the water heater using the exhaust heat are disposed in a flue through which exhaust heat passes.

9. An exhaust-heat using refrigerating system characterized by comprising:
   a heat pump apparatus equipped with a compressor, a first heat exchanger, a pressure-reducing device and a second heat exchanger; and an absorption type refrigerating machine equipped with a regenerator using exhaust heat as a heat source, a condenser, an evaporator and an absorber, wherein the evaporator of the absorption type refrigerating machine is connected to the first heat exchanger in parallel.

10. An exhaust-heat using refrigerating system, characterized by comprising:
   a heat pump apparatus equipped with a compressor, a a first heat exchanger, a pressure-reducing device and a second heat exchanger; and
   an absorption type refrigerating machine equipped with a regenerator using exhaust heat as a heat source, a condenser, an evaporator and an absorber, wherein the evaporator of the absorption type refrigerating machine is connected to the first heat exchanger in series.

11. An exhaust-heat using refrigerating system characterized by comprising:
   an electric generator;
   a micro gas turbine for driving the electric generator;
   a heat pump apparatus equipped with a compressor driven by electric power of the electric generator, a first heat exchanger, a pressure-reducing device and a second heat exchanger; and
   an absorption type refrigerating machine equipped with a regenerator using exhaust heat of the micro gas turbine as a heat source, a condenser, an evaporator and an absorber, wherein the evaporator of the absorption type refrigerating machine is connected to the first heat exchanger in parallel.

12. An exhaust-heat using refrigerating system characterized by comprising:
   an electric generator;
   a micro gas turbine for driving the electric generator;
   a heat pump apparatus equipped with a compressor driven by electric power of the electric generator, a first heat exchanger, a pressure-reducing device and a second heat exchanger; and
   an absorption type refrigerating machine equipped with a regenerator using exhaust heat of the micro gas turbine as a heat source, a condenser, an evaporator and an absorber, wherein the evaporator of the absorption type refrigerating machine is connected to the first heat exchanger in series.

13. The exhaust-heat using refrigerating system according to any one of claims 9 to 12, wherein the regenerator of the absorption type refrigerating machine is disposed in a flue through which exhaust heat passes.

14. The exhaust-heat using refrigerating system according to any one of claims 1, 2, 3, 4, 9, 10, 11 or 12, wherein the first heat exchanger is of an air-cooling type.

15. The exhaust-heat using refrigerating system according to any one of claims 1, 2, 3, 4, 9, 10, 11, or 12, wherein the absorber of the absorption type refrigerating machine is equipped with a refrigerant mixer, an absorption heat radiator and solution circulating means.

* * * * *